Dec. 23, 1941.                J. W. JUVINALL ET AL                2,267,108
                              GLASS WORKING MACHINE
                              Filed Oct. 4, 1939            2 Sheets-Sheet 1
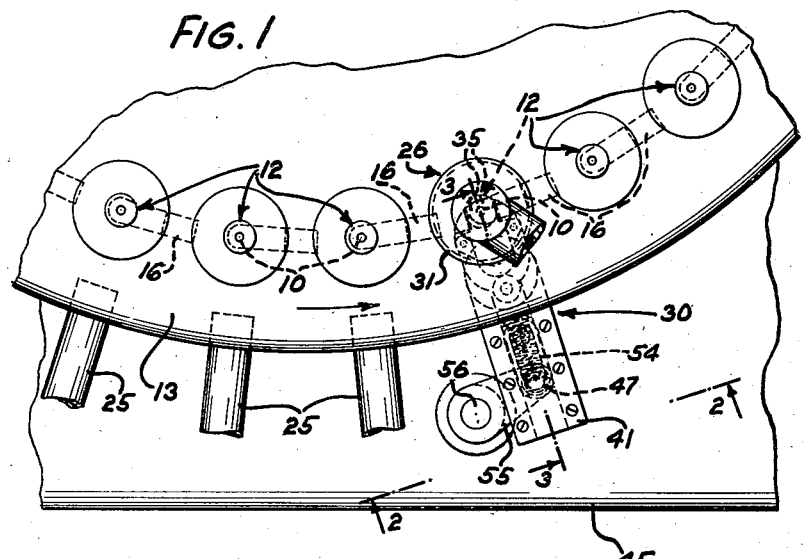
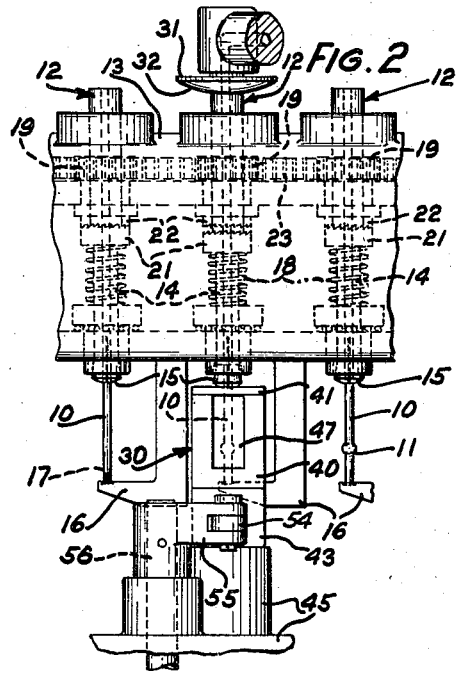
INVENTORS
J. W. JUVINALL
W. B. WINES
BY Emery Robinson
ATTORNEY

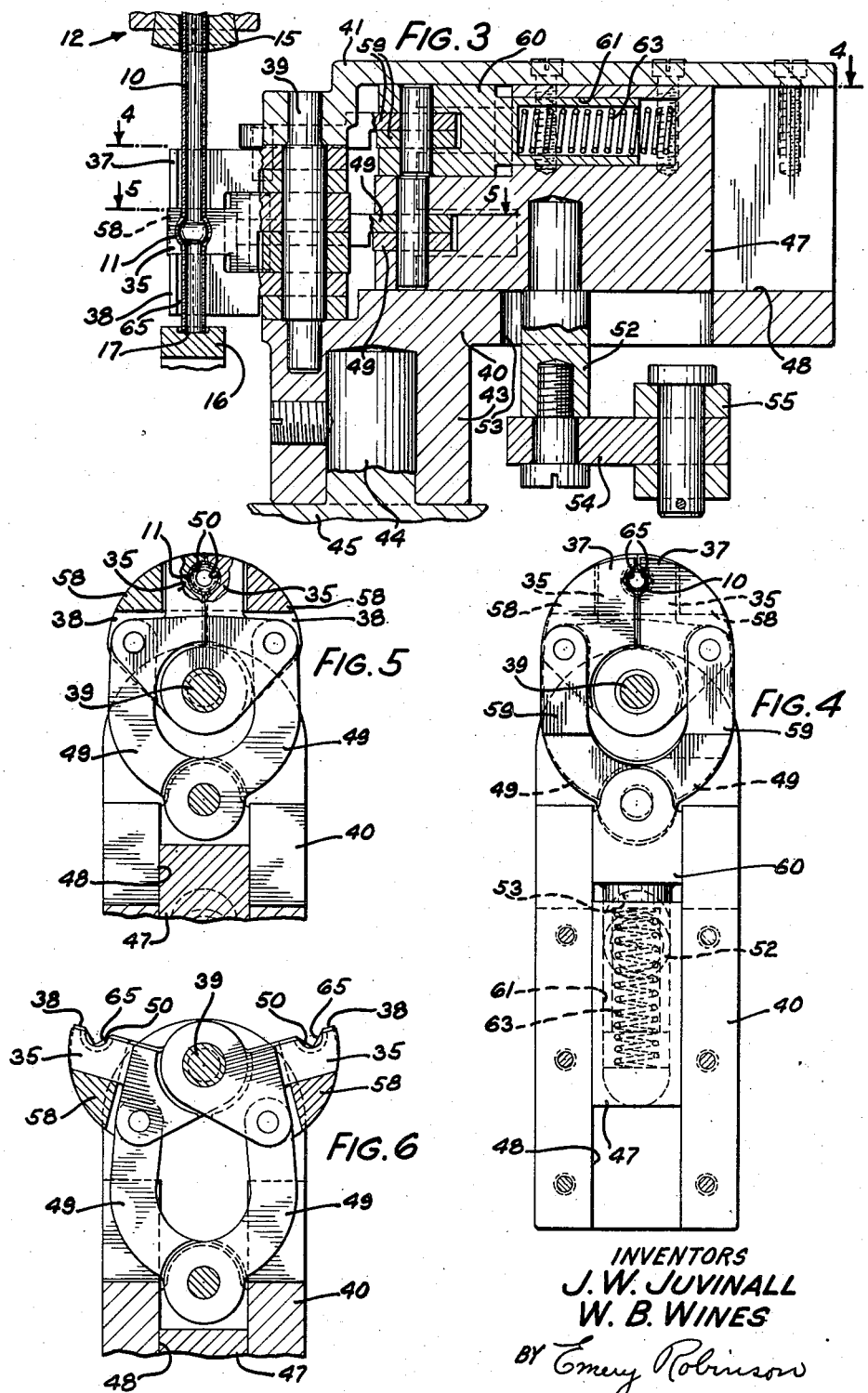

Patented Dec. 23, 1941

2,267,108

UNITED STATES PATENT OFFICE 2,267,108

GLASS WORKING MACHINE

James W. Juvinall, La Grange Park, and William B. Wines, Downers Grove, Ill., assignors to Western Electric Company, Incorporated, New York, N. Y., a corporation of New York Application October 4, 1939, Serial No. 297,838

11 Claims. (Cl. 49—2)

This invention relates to glass working machines, and more particularly to machines for making filament supporting stems for electric lamps.

Objects of the invention are to provide a simple and inexpensive machine whereby glass articles, such as electric lamp filament supporting stems and the like, may be produced expeditiously and with a minimum amount of manual effort.

In accordance with one embodiment of the invention there is provided a machine for making electric lamp filament supporting stems from individual lengths of glass tubing, in which an annular series of chucks, each adapted to receive and hold a glass tube, are indexed through several heating positions and then to a shaping or molding position where the tubes are released from the chucks and are centered with respect to a pair of mold jaws by two pairs of clamping jaws, one above and the other below the mold jaws. The clamping jaws are actuated by the same mechanism that operates the mold jaws, but through an intermediate spring which provides a yieldable clamping action and thus compensates for slight variations in the diameter of the tubes.

A more complete understanding of the invention may be had from the following detailed description when read in conjunction with the accompanying drawings, in which Fig. 1 is a plan view of a portion of a stem making machine embodying the invention;

Fig. 2 is an elevational view thereof, looking in the direction indicated by the arrows on line 2—2 of Fig. 1;

Fig. 3 is a vertical sectional view of the molding mechanism, taken on line 3—3 of Fig. 1;

Fig. 4 is a plan sectional view on line 4—4 of Fig. 3;

Fig. 5 is a plan sectional view on line 5—5 of Fig. 3;

Fig. 6 is a plan sectional view similar to Fig. 5, but showing the molding jaws and the lower clamping jaws in their open positions; and Fig. 7 is an elevational view of a partially formed lamp filament supporting stem.

Although not limited thereto, the invention is herein illustrated and described as embodied in a machine for making filament supporting stems for small incandescent electric lamps of the type disclosed in McBerty et al. Patent No. 709,996. A partially formed filament supporting stem of the type referred to is shown in Fig. 7. It comprises a short length of glass tubing 10 having a spherical enlargement 11 intermediate its ends for sealing it into a lamp bulb in the manner disclosed in the patent referred to.

Referring now to Figs. 1 and 2, the machine illustrated therein comprises an annular series of work holding chucks 12, 12 rotatably mounted in suitable bearings near the periphery of a rotary circular carrier or turret 13, only a portion of which is shown. Each of the chucks comprises a tubular member or sleeve 14 having a spring collet 15 at its lower end for holding the upper end of a glass tube blank 10, and each chuck has associated therewith a shelf-like support 16 having a circular depression 17 for loosely receiving the lower end of the glass tube blank. Each chuck sleeve 14 is vertically movable and urged upwardly by a compression spring 18, whereby the upper end of the glass tube blank is yieldably clamped in the spring collet at the lower end of the chuck sleeve. Loosely mounted on each chuck sleeve is a gear 19, from which the chuck sleeve is rotated through a clutch comprising a driven member 21 fixed to the chuck sleeve and a driving member 22 fixed to the associated gear 19. It will be noted that the clutch members are normally held engaged by the spring 18. The gears 19, 19 are all constantly driven by a common central driving gear 23.

Any suitable mechanism (none shown) may be provided for imparting an intermittent rotary motion to the turret 13, whereby the several chucks, each holding a glass tube blank, are advanced, step by step, past a series of gas burners 25, 25 adapted to soften each of the glass tubes intermediate its ends in the region where the spherical enlargement is to be formed. The heated tubes are then indexed, one at a time, to a shaping or molding position 26, where the spherical enlargement is formed thereon with the aid of a molding device indicated generally in Figs. 1 and 2 by the reference numeral 30. Upon being indexed to the molding position the upper end of each chuck slides underneath and into registry with a stationary air nozzle 31 (Fig. 2) which is connected to a suitable source (none shown) of compressed air. The air nozzle has a cam surface 32 adapted to depress the chuck sleeve against the opposing force of its spring 18. This disengages the driving clutch, thus stopping rotation of the chuck, and also shifts the collet 15 downwardly to a position where it is permitted to open by its own spring tension, whereby the glass tube is released therefrom but remains supported by the shelf 16.

As shown more clearly in Figs. 3 to 6, inclusive, the molding device 30 comprises a pair of mold jaws 35, 35, a pair of upper clamping jaws 37, 37, and a pair of lower clamping jaws 38, 38, all pivotally mounted upon a common vertical shaft 39, the lower end of which is fixed in a supporting block 40 (Fig. 3) while its upper end extends into a plate 41 removably secured to the top of the block. The supporting block has a depending tubular portion 43 by means of which it is attached to an upstanding post 44 on a stationary portion 45 of the machine frame.

The mold jaws are opened and closed by the movement of a slide 47 mounted in a longitudinal groove 48 in the supporting block. Each of the mold jaws is operatively connected to the slide by means of an arcuate link 49 (Fig. 5). Each mold jaw has a substantially semi-spherical mold cavity 50 (Fig. 6). When the mold jaws are closed, as shown in Figs. 3, 4 and 5, the semi-spherical cavities thereof cooperate to provide a substantially spherical mold cavity of somewhat larger diameter than the glass tube blanks.

The mold operating slide 47 is provided with a depending stud 52 (Fig. 3) which protrudes through an elongated slot 53 in supporting block 40. A link 54 connects the stud 52 to an operating lever 55 attached to an oscillatory shaft 56 (Fig. 2). The shaft 56 is oscillated by suitable means (none shown) in timed relation with the movement of the turret, whereby the mold jaws are opened and closed in synchronism with the movement of the turret.

The upper and lower pairs of clamping jaws, as mentioned above, are pivotally mounted upon the vertical shaft 39, the upper pair above and the lower pair below the mold jaws 35. The two pairs of clamping jaws are rigidly interconnected by integral connecting portions 58, 58, so that the upper and lower jaws open and close in unison. Each of the upper jaws is connected by an arcuate link 59 (Fig. 4) to a plunger 60 which is slidable in a longitudinal bore 61 in the mold operating slide 47. A coil spring 63 normally urges the plunger toward the left (Fig. 3) to close the clamping jaws. However, when the mold jaws are opened, they engage the vertical connecting portion 58 between the upper and lower clamping jaws, thereby opening the clamping jaws and maintaining them open against the opposing force of the spring. Each of the clamping jaws has a V-groove 65 (Fig. 6) for accommodating the glass tube blank and for accurately aligning it with respect to the spherical mold cavity of the mold jaws. The V-grooves and the spring plunger arrangement for closing the clamping jaws automatically compensate for variations in the diameter of the glass tubes.

In the operation of the machine, the turret 13 is intermittently rotated so that each of the work holding chucks is indexed first to a loading position (not shown) where a glass tube blank is inserted into the chuck, then through the several heating positions, and then to the molding position. During the indexing period of the turret, the mold jaws 35 and the clamping jaws 37 and 38 are open and remain open until the turret comes to rest at the end of each indexing movement. Each glass tube blank, upon arriving at the molding position, is released from the chuck, as described above. The released tube remains supported upon the shelf 16 and is loosely held in the open collet 15 of the chuck, which holds it in position to be grasped by the clamping jaws 37 and 38.

Simultaneously with the release of the glass tube from the chuck, the slide 47 is moved forwardly to the position in which it is shown in Fig. 3. This movement of the slide operates through links 49 to close the mold jaws 35 upon the previously heated portion of the glass tube. The closing of the mold jaws allows the upper and lower clamping jaws to close under the force of spring pressed plunger 60, whereby the tube is clamped between the two pairs of clamping jaws and thereby accurately centered with respect to the spherical mold cavity provided by the mold jaws. It will be obvious, therefore, that the centering of the glass tubes with respect to the mold cavity is readily attainable without maintaining accurate alignment between each of the chucks and the mold.

Soon after the closing of the mold jaws and clamping jaws, a blast of air is forced through nozzle 31 into the glass tube, whereby the heated portion of the tube is blown out against the wall of the spherical mold cavity, thus forming the spherical enlargement 11. The mold jaws are then opened and the clamping jaws are thereby also opened, after which the turret is indexed to the next position, thus completing one cycle of operation of the machine. It will be understood, of course, that the formed tube is again grasped by the chuck as the latter is indexed from the molding position and may be removed from the chuck at any position subsequent to the molding position. Also, if desired, other operations may be performed upon the tube at the several positions following the molding position. Furthermore, it will be obvious that the invention is not limited to the structural details herein illustrated and described, except insofar as is defined by the appended claims.

What is claimed is:

1. In a glass working machine, complementary mold members cooperating to provide a mold cavity, cooperating clamping jaws for centering and holding a glass tube within said cavity, means for closing said mold members, and means rendered effective by the closing of said mold members for closing said clamping members.

2. In a glass working machine, complementary mold members adapted to encircle a glass tube, means for centering the tube between said mold members, means for operating said mold members, and means under the control of said mold members for operating said centering means.

3. In a glass working machine, a pair of pivoted mold members, a plurality of work holding members, a slide for operating said mold members and said work holding members, and a spring interposed between the slide and said work holding members.

4. In a glass working machine, a pair of pivoted mold members, two pairs of work holding members pivoted coaxially with said mold members, one pair above and the other pair below said mold members, a slide for operating said mold members, and a spring pressed plunger mounted in the slide for operating said work holding members.

5. In a machine for making filament supporting stems for electric lamps, a chuck for holding a stem tube, means for advancing the chuck and stem tube through a series of spaced positions, means at one of said positions for releasing the stem tube from said chuck, means at said position for shaping said stem tube, and means at said position for centering the stem tube with respect to said shaping means.

6. In a machine for making filament supporting stems for electric lamps, a circular carrier having an annular series of chucks, each adapted to hold a tubular glass stem, said carrier being rotatable about a central axis to advance said chucks, one at a time, to a molding position, means at said position for releasing the tubular stems from the chucks, and means at said position for shaping the stem, said shaping means comprising complementary mold members cooperating to provide a mold cavity for shaping the tubular stems, and means for centering the stems with respect to said mold cavity.

7. In a machine for making filament supporting stems for electric lamps, a circular carrier having an annular series of chucks, each adapted to hold a tubular glass stem, said carrier being rotatable to advance said chucks through a series of work positions, means at one of said positions for softening an intermediate portion of each tubular stem, means at another of said positions for releasing the softened stems from the chucks, and means at the last mentioned position for shaping the softened portions of the stems, said shaping means comprising complementary mold members cooperating to provide a mold cavity for the softened portions of the stems, and means under the control of said mold members for centering the stems with respect to said mold cavity.

8. In a machine for making filament supporting stems for electric lamps, a circular carrier having an annular series of chucks, each adapted to hold a tubular glass stem, said carrier being rotatable to advance said chucks through a series of work positions, means at one of said positions for softening an intermediate portion of each tubular stem, means at another of said positions for releasing the softened stems from the chucks, and means at the last mentioned position for shaping the softened portions of the stems, said shaping means comprising complementary mold members pivoted upon a common axis and cooperating to provide a mold cavity for the softened portions of the stems, a plurality of clamping members pivoted on said axis for centering the stems with respect to said mold cavity, means under the control of said mold members for operating said clamping members, and means for introducing compressed air into the softened portion of each stem to cause it to conform to the shape of the mold cavity.

9. In a glass working machine, means for holding a glass article, means for intermittently advancing said holding means to present the article to a series of positions, means at one of said positions for releasing the article from said holding means, means at said position for shaping the article, and means at said position for predeterminedly positioning the article with respect to said shaping means.

10. In a glass working machine, a carrier comprising a series of holders, each adapted to hold a glass article, said carrier being movable to advance said holders, one at a time, to a shaping position, means at said position for releasing the articles from the holders, means at said position for shaping the released articles, and means at said position for predeterminedly positioning the released articles with respect to said shaping means.

11. In a glass working machine, a carrier comprising a series of holders, each adapted to hold a glass article, said carrier being movable to advance said holders, one at a time, to a shaping position, means at said position for releasing the articles from said holders, and means at said position for shaping the released articles, said shaping means comprising mold members cooperating to provide a mold cavity for shaping the articles, and means for centering the released articles with respect to said mold cavity.

JAMES W. JUVINALL.
WILLIAM B. WINES.